United States Patent Office 3,642,990
Patented Feb. 15, 1972

3,642,990
PROCESS OF INHIBITING TRANSPLANTED MAMMARY ADENOCARCINOMA IN MICE USING POLYHALO (AZO OR AZOXY) BENZENE COMPOUNDS
Ralph Grassing Child, Pearl River, N.Y., and Steve George Svokos, Westwood, and Andrew Stephen Tomcufcik, Old Tappan, N.J., assignors to American Cyanamid Company, Stamford, Conn.
No Drawing. Filed July 15, 1968, Ser. No. 744,651
Int. Cl. A61k 27/00
U.S. Cl. 424—226
4 Claims

ABSTRACT OF THE DISCLOSURE

The process of inhibiting transplanted mammary adenocarcinoma in mice which comprises administering to the animal a compound selected from the group consisting of: 3,3′,4,4′-tetrachloroazobenzene, 3,3′-dichloro - 4,4′ - difluoroazobenzene, 3,3′,4,4′-tetrabromoazobenzene, 2,2′,3, 3′,4,4′-hexachloroazobenzene, 3,3′,4,4′,5,5′ - hexachloroazobenzene, 6-hydroxy-3,3′,4,4′-tetrachloroazobenzene, 3, 3′,4,4′,5,5′-hexachloroazoxybenzene, 2,2′,3,3′,4,4′ - hexachloroazoxybenzene, 2,2′-dimethyl-4,4′,5,5′ - tetrachloroazoxybenzene, and 3,3′,4,4′ - tetrachloroazoxybenzene. Therapeutic compositions in dosage unit form can be prepared by combining any of the above compounds in an amount of between 1 and 250 milligrams per dosage unit with a pharmaceutical carrier.

This invention relates to compositions containing polyhalo (azo or azoxy) benzene compounds, and the use of polyhalo (azo or azoxy) benzene compounds to inhibit or prevent transplanted mammary adenocarcinoma in mice.

It is an object of the present invention to provide compositions containing polyhalo (azo or azoxy) benzene compounds. It is a further object of the present invention to provide a method for controlling growth of transplanted mammary adenocarcinoma in mice.

The present invention provides a method for inhibiting the growth of transplanted mammary adenocarcinoma in mice by administering a pharmaceutical composition containing at least one of the following polyhaloazobenzenes or polyhaloazoxybenzenes:

3,3′,4,4′-tetrachloroazobenzene,
3,3′-dichloro-4,4′-difluoroazobenzene,
3,3′,4,4′-tetrabromoazobenzene,
2,2′,3,3′,4,4′-hexachloroazobenzene,
3,3′,4,4′,5,5′-hexachloroazobenzene,
6-hydroxy-3,3′,4,4′-tetrachloroazobenzene,
3,3′,4,4′,5,5′-hexachloroazoxybenzene,
2,2′,3,3′,4,4′-hexachloroazoxybenzene,
2,2′-dimethyl-4,4′,5,5′-tetrachloroazoxybenzene, and/or
3,3′,4,4′-tetrachloroazoxybenzene.

Furthermore, the present invention provides pharmaceutical compositions containing at least one of the above-named polyhaloazobenzenes or polyhaloazoxybenzenes. It has been discovered that many of the above-named compounds show unusual inhibitory activity against spontaneous cancers. The compounds of this invention which show cancer-inhibitory activities are, in general, crystalline solids ranging in colors from yellow to orange or gold and approaching red. They are neutral, forming salts under ordinary conditions with neither acids nor bases, and exhibit limited solubility in water.

The compounds employed by the present invention can be prepared by any one of three processes.

(I) In one process, a dihalo aniline is catalytically converted to produce the corresponding azobenzene product or azoxybenzene product. The reaction to obtain the azobenzene product is carried out in the absence of free oxygen by contacting the aniline reactant with an oxidation catalyst such as sodium perborate tetrahydrate, in an acid solvent such as glacial acetic acid. The reaction mixture is heated to above about 20° C., but below that temperature at which decomposition of either the reactant or the product occurs. Satisfactory yields are obtained when operating at temperatures between about 20° C. and about 55° C. The reaction mixture is maintained at elevated temperatures for a period of time sufficient to permit the reaction to go to completion, usually between about 1 hour and about 8 hours. The reaction mixture is then cooled to below about 20° C. and the product precipitates from the reaction mixture and is recovered. When the reaction is carried out by contacting the reaction mixture with an oxygen containing gas such as air, or an oxygen producing compound such as hydrogen peroxide, the reaction product comprises a mixture of the polyhaloazobenzene compound and the polyhaloazoxybenzene compound. When it is desired that the azoxybenzene compound be the major product, a free oxygen-containing gas is bubbled through the reaction mixture during heating. One the other hand, when it is desired that the azobenzene compound be the major product the reaction is carried out by blanketing the reaction mixture with an inert gas. The azobenzene and azoxybenzene products can be separated by recrystallization from a suitable solvent such as glacial acetic acid, the azoxybenzene products being less soluble.

(II) The polyhaloazoxybenzene products of this invention can also be obtained by oxidizing the corresponding polyhaloazobenzene compound. The oxidation is carried out by contacting the azobenzene compound with an oxidizer such as hydrogen peroxide, potassium permanganate, sodium chlorate, sodium perchlorate, and the like. The reaction is carried out by dissolving or dispersing the reactants in an acid medium such as glacial acetic acid. The reaction is carried out at an elevated temperature above about 20° C. but below that at which decomposition of the reactant or the product occurs. The reaction is preferably carried out at a temperature between about 20° C. and about 60° C. for a period of time of between about 2 hours and about 24 hours. The reaction mixture is then cooled to below about 20° C. to precipitate the azoxybenzene compound, which is then recovered from the reaction medium as, for example, by filtration.

(III) The polyhalo (azo or azoxy) benzene compounds can also be prepared from the corresponding polyhalo-nitrobenzene starting materials under reductive conditions in the presence of a mildly acidic compound. The catalytic reduction can be carried out in the presence of a powdered metal catalyst such as zinc dust, iron dust, or any other reduction catalyst. A diluent also can be employed which is compatible with the mildly acidic compound, such as water or lower alkanols such as methanol, ethanol, propanol or the like. Suitable mildly acid compounds which can be employed include acetic acid or ammonium chloride. The reaction is carred out at an elevated temperature above about 50° C. but below that at which decomposition of either the reactant or the product occurs. It is preferred to carry out the reduction at a temperature between about 50° C. and 80° C. for a period of time between about 2 hours and about 8 hours. The azobenzene product is obtained when the reaction is carried out in the absence of free oxygen. This can be easily accomplished by blanketing the reaction mixture with an inert gas. When it is desired to produce the corresponding azoxybenzene compound, a free oxygen containing gas, such as air or oxygen, which is bubbled through the reaction mixture at elevated temperatures. The desired product is obtained by cooling the reaction mixture to precipitate the product and the product is thereafter separated from the reaction medium as, for example, by filtration.

(IV) The compound, 6-hydroxy-3,3',4,4'-tetrachloroazobenzene, is prepared by reacting a 3,3',4,4'-tetrachlorobenzenediazonium salt with 3,4 - dichlorophenol. The reaction is carried out in the presence of an acid diluent such as glacial acetic acid at reduced temperature of between about 0° C. and about 5° C. for a period of time between about 2 hours and about 6 hours. A basic salt as, for example, sodium acetate, potassium acetate, or the like, or a base such as sodium hydroxide, or potassium hydroxide, is added to the reaction mixture to increase the pH thereof above about 5 and thereafter water is added to precipitate the compound, 6-hydroxy-3,3',4,4'-tetrachlorazobenzene. The diazonium salt starting material can be prepared by any conventional method as for example by reacting 3,4-dichloroaniline in the presence of sodium nitrite and a strong mineral acid such as hydrochloric acid.

The compounds set forth above can be administered orally or parenterally to inhibit the growth of transplanted mammary adenocarcinoma. The compositions of the present invention can be administered in unit dosage form as tablets, pills, capsules, powders, granules, sterile parenteral solutions or suspensions, oral solutions or suspensions and the like. For preparing solid compositions such as tablets, the principal active ingredient is mixed with any conventional tableting ingredients such as corn starch, lactose, sucrose, sorbitol, talc, stearic acid, magnesium stearate, dicalcium phosphate, gums and functionally similar materials as pharmaceutical diluents or carriers. The tablets or pills containing the active compounds can be laminated or otherwise compounded to provide a dosage form affording the advantage of prolonged or delayed action or predetermined successive action of the encloed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate, and the like. A particularly advantageous enteric coating comprises a styrene-maleic acid copolymer together with known materials contributing to the enteric properties of the coating.

The liquid forms in which the novel composition of the present invention may be incorporated for administration include aqueous suspensions or solutions, suitable flavored syrups, aqueous or oil or other solutions or suspensions, flavored emulsions with edible oil such as cottonseed oil, sesame oil, coconut oil, peanut oil and the like, as well as elixirs and similar pharmaceutical vehicles. Suitable dispersing or suspending agents for aqueous suspensions include synthetic and natural gums such as tragacanth, acacia, alginate, dextran, sodium carboxymethylcellulose, methylcellulose, polyvinylpyrrolidone, gelatin and the like. Sterile suspensions or solutions are required for parenteral use. Isotonic preparations containing suitable preservatives are also highly desirable for injection use.

The term "unit dosage form" as used in the specification and claims refers to physically discrete units suitable as unitary dosages, each unit containing a predetermined quantity of active material calculated to produce the desired therapeutic effect in association with the required pharmaceutical diluent, carrier or vehicle. A convenient dosage unit form is one containing between about 1 mg. and about 250 mg., preferably between about 100 mg. to about 150 mg., of active therapeutic ingredient.

The amount of a single dose or of a daily dose to be administered will vary with the size, age, sex and physical condition of the individual to be treated, but it should be such as to give a proportionate dosage of from about 10 milligrams to 100 milligrams per kilogram of body weight per day. In practice, the active compound is administered beginning with small dosages and progressing to larger dosages to provide satisfactory inhibition with minimal adverse side effects. In terms of total weight, this is usually from about 100 milligrams to about 1,000 milligrams daily with the preferred dosage unit comprising about 100 milligrams of active ingredient. The invention will be described in greater detail in conjunction with the following specific examples.

EXAMPLE 1

Preparation of 3,3',4,4'-tetrachloroazobenzene

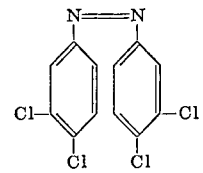

A solution of 32.4 g. (0.2 mole) of 3,4-dichloroaniline in 300 ml. of glacial acetic acid is added, dropwise in sixty minutes, to a solution of 30.8 g. (0.2 mole) of sodium perborate tetrahydrate in 800 ml. of glacial acetic acid. The reaction mixture is then warmed to 55° C. and allowed to cool to room temperature. The orange precipitate is collected, washed with acetic acid and water, and dried. The yield is 21 g. (65%); melting point 150–151° C.

EXAMPLE 2

Preparation of 3,3'-dichloro-4,4'-difluoroazobenzene

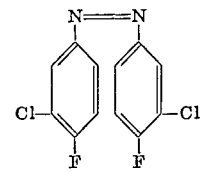

The subject compound is prepared by the procedure of Example 1 by employing 3-chloro-4-fluoroaniline rather than 3,4-dichloroaniline. The product has a melting point of 110–115° C.

EXAMPLE 3

Preparation of 3,3',4,4'-tetrabromoazobenzene

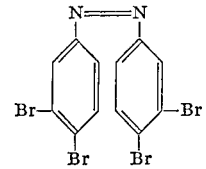

The subject compound is prepared by the procedure of Example 1, by employing 3,4-dibromoaniline rather than 3,4-dichloroaniline. The product has a melting point of 159–160° C.

EXAMPLE 4

Preparation of 2,2',3,3',4,4'-hexachloroazobenzene

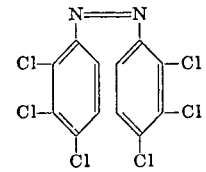

Solutions of 5 gm. of 2,3,4-trichloroaniline in 20 ml. glacial acetic acid and 3.0 gm. of sodium perborate tetrahydrate in 100 ml. of glacial acetic acid are combined and stirred at room temperature. After three days, the precipitate is removed by filtration, and the filtrate allowed to stand an additional two days. The 2,2',3,3',4,4'-hexachloroazobenzene is collected, washed with acetic acid and water, and dried. The yield is 1.2 gm. and the melting point 238–240° C.

EXAMPLE 5

Preparation of 3,3',4,4',5,5'-hexachloroazobenzene

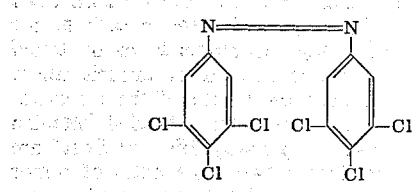

The subject compound is prepared in the manner described in Example 4, by employing 3,4,5-trichloroaniline rather than 2,3,4-trichloroaniline. The product has a melting point of 305–307° C.

EXAMPLE 6

Preparation of 6-hydroxy-3,3',4,4'-tetrachloroazobenzene

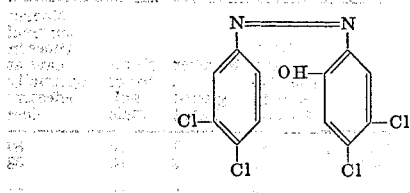

A mixture of 5.66 gm. of 3,4-dichloroaniline, 12.5 ml. of concentrated hydrochloric acid, and 50 ml. of water is cooled to 0° and mixed with a solution of 2.76 gm. of sodium nitrite in 10 ml. of water and allowed to stand for one hour. The diazonium salt solution which is obtained thereby is added to a solution of 5.7 gm. of 3,4-dichlorophenol in 35 ml. of glacial acetic acid. The resulting solution is allowed to stand at 0° C. for three hours and thereafter, 13.3 g. of solid sodium acetate are added. Addition of water precipitates a solid which is collected, the solid is washed with water, dried, and recrystallized from acetone to yield the azo derivative melting at 164°–165° C.

EXAMPLE 7

Preparation of 3,3',4,4'-tetrachloroazoxybenzene

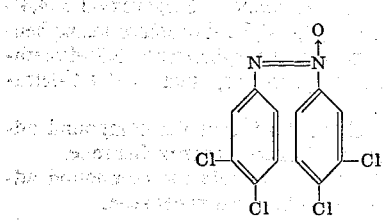

Solutions of 96 gm. of 3,4-dichloronitrobenzene in one liter of ethanol and 21.2 gm. of ammonium chloride in 265 ml. of water are combined, and the mixture stirred at reflux as 150 gm. of zinc dust are added portionwise during forty-five minutes. After a further thirty minutes of refluxing, the mixture is dried in vacuo. The dried mixture is then extracted with four 200 ml. portions of boiling ethanol and a stream of air is then passed through the combined ethanolic extracts. A precipitate is gradually formed and periodically collected and the melting point determined. When the melting point reaches 138° C. or higher, the collected fractions are combined. After four weeks, the yield of pure subject compound is 23 gm.

EXAMPLE 8

Preparation of 3,3',4,4',5,5'-hexachloroazoxybenzene

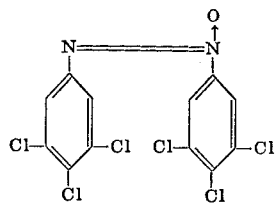

Solutions of 4.8 gm. of 3,4,5-trichloroaniline in 20 ml. of glacial acetic acid and 3.77 gm. of sodium perborate are combined at room temperature and allowed to stand overnight. A precipitate formed and is collected, washed with acetic acid and water, and dried. The yield of product is 2.0 gm. and it melts at 265°–268° C.

EXAMPLE 9

Preparation of 2,2',3,3',4,4'-hexachloroazoxybenzene

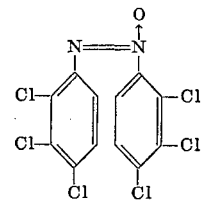

The subject compound is prepared by the procedure of Example 8, by employing 2,3,4-trichloroaniline rather than 3,4,5-trichloroaniline. The product melts at 186°–187° C.

EXAMPLE 10

Preparation of 2,2'-dimethyl-4,4',5,5'-tetrachloroazoxy benzene

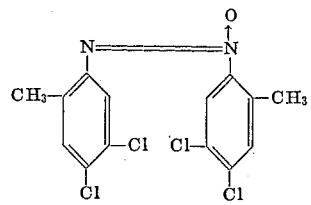

The subject compound is prepared by the procedure of Example 8, by employing 2-methyl-4,5-dichloroaniline rather than 3,4,5-trichloroaniline. The product obtained melts at 167°–168° C.

EXAMPLE 11

Survival studies of mice bearing spontaneous mammary cancers treated with 3,3',4,4'-tetrachloroazoxybenzene Spontaneous mammary malignant tumor experiments were conducted on inbred strain of mice bearing single tumors from 15 to 20 millimeters in diameter. These mice weighed from 25 to 35 grams each and were from 8 to 9 months old. The test animals were randomly divided into groups of 5. Six such groups of 5 animals each (a total of 30 mice) received 6 graded doses of test compound. Administration was subcutaneously daily. In a total of 3 tests (a total of 90 treated animals) the optimally effective dose of 3,3',4,4'-tetrachloroazoxybenzene was found to be 81 milligrams per kilogram of body weight per mouse. At this dose, the median survival time was 80 days. Median survival time of 65 untreated controls was 34 days.

EXAMPLE 12

Dose-response activities in mice bearing transplanted mammary adenocarcinoma

The animals used were an inbred strain of mice weighing 18 to 20 grams. Unit test groups were 3 mice for treatment and 6 controls. The techniques of transplanting and excising the tumors employed are described by Suguira, K. and Stock, C. C., "Studies in a Tumor Spectrum," Cancer 5, pp. 382–402, 1952. Donor mice bearing firm mammary Adenocarcinoma tumors were selected and killed by cervical dislocation. The tumor was then excised under relatively aseptic conditions. The excised tumor was placed in a petri dish filled with sterile saline and cut into pieces approximately 2 millimeters in size. Each particle to be used was placed within the barrel of a sterile 13 gauge trocar. Each trocar was then introduced subcutaneously through the skin of the dorsal lumbar region and the point was carried up to the axially region where the implant was deposited. The implanted mice were held for 17 days and 17 days after implant the tumors were palpated and then classified according to tumor size: small, medium or large. Animals from each tumor size were then randomly distributed into treatment groups of 3 mice each and control groups of 6 mice each. Each test consisted of a control and 3 to 5 treatment levels ranging from 100 to 250 milligrams per kilogram of body weight depending upon the compound being tested. The test compounds were administered in 1% aqueous starch-buffer vehicle. On the sixth day following the first treatment, the tumors were excised and weighed. In each case the following activity ratio was determined.

Activity ratio = C/T $$= \frac{\text{Average weight of tumors from control mice}}{\text{Average weight of tumors from treated mice}}$$

Activity is then determined according to the following sequential criteria: In the case of Adenocarcinoma, the test compound is deemed active if its activity ratio is 3.72 or greater, and inactive if 1.92 or lower. In all cases, determination of "active" according to these criteria is confirmed by means of a confirmatory test run using the same conditions and criteria.

The results are expressed below in terms of activity ratios in Table I. The results for each compound are obtained by testing groups of nine mice.

TABLE I

Pooled results obtained with dose-response tests compounds administered intraperitoneally daily

| Compound | Dose in mg./kg. | Number of groups tested | Number of animals | Average C/T activity ratios |
|---|---|---|---|---|
| (a) 3,3',4,4'-tetrachloroazobenzene | 250 | 3 | 27 | 4.62 |
| (b) 3,3'-dichloro-4,4'-difluoroazobenzene | 250 | 2 | 18 | 5.92 |
| (c) 3,3',4,4'-tetrabromoazobenzene | 250 | 3 | 27 | 4.74 |
| (d) 6-hydroxy-3,3',4,4'-tetrachloroazobenzene | 250 | 4 | 36 | 3.40 |
| (e) 2,2',3,3',4,4'-hexachloroazobenzene | 250 | 2 | 18 | 10.10 |
| (f) 3,3',4,4'-tetrachloroazoxybenzene | 100 | 2 | 18 | 8.11 |
| (g) 3,3',4,4',5,5'-hexachloroazoxybenzene | 250 | 5 | 45 | 3.36 |
| (h) 2,2',3,3',4,4'-hexachloroazoxybenzene | 250 | 2 | 18 | 9.86 |
| (i) 2,2'-dimethyl-4,4',5,5'-tetrachloroazoxybenzene | 250 | 3 | 27 | 5.49 |

As can be seen from Table I, each of the compounds tested are shown to be active for inhibiting the growth of Adenocarcinoma tumors except compounds (d) and (g) which are shown to be marginally active.

EXAMPLE 13

Survival studies in mice bearing transplanted mammary adenocarcinoma

In addition to the dose-response studies described above in Example 12, survival studies were also made with mice bearing the transplantable mammary Adenocarcinoma. Each of these tests was composed of 6 graded levels of treatment. Five mice bearing 17-day old medium sized tumors (determined by palpation) were in each of the treatment or control groups. Compounds to be tested were given by single intraperitoneal daily administration. Table II below summarizes the results of these survival studies. In Table II under the column headed "Median Survival Times in Days at Optimally Effective Dose" are given the intervals in days between the dates of tumor implantation and the dates calculated as the median survival dates of the group of 5 mice receiving whichever dose of the particular compound gave the optimal median survival. Under the column headed "Number of Animals" are given the total number of mice (i.e., the total numbers at all 6 levels) used in all tests.

TABLE II

Results of survival studies in mice bearing transplanted mammary adenocarcinoma—Administration intraperitoneally once daily

| Compound | Optimally effective dose in mg./kg. | Number of groups tested | Number of animals | Median survival times in days at optimally effective dose |
|---|---|---|---|---|
| 3,3',4,4'-tetrachloroazobenzene | 81 | 3 | 90 | 89 |
| 3,3'-dichloro-4,4'-difluoroazobenzene | 9 | 2 | 60 | 38 |
| 2,2',3,3',4,4'-hexachloroazobenzene | 3 | 1 | 30 | 34 |
| 3,3',4,4'-tetrachloroazoxybenzene | 27 | 4 | 120 | 88 |
| 2,2',3,3',4,4'-hexachloroazoxybenzene | 9 | 3 | 90 | 105 |
| Controls | | | 350 | 32 |

As can be seen from Table II, the compounds of this invention inhibit the growth of Adenocarcinoma tumors sufficiently to significantly extend the survival time of tumor-bearing animals.

What is claimed is:

1. The process of inhibiting transplanted mammary adenocarcinoma in a mouse which comprises administering to the said mouse from 10 to 100 milligrams per kilogram of body weight per day of a compound selected from the group consisting of: 3,3',4,4'-tetrachloroazobenzene, 3,3'-dichloro-4,4'-difluoroazobenzene, 3,3',4,4'-tetrabromoazobenzene, 2,2',3,3',4,4' - hexachloroazobenzene, 3,3',4,4',5,5'-hexachloroazobenzene, 6-hydroxy-3,3',4,4'-tetrachloroazobenzene, 3,3',4,4',5,5'-hexachloroazoxybenzene, 2,2',3,3',4,4'-hexachloroazoxybenzene, 2,2'-dimethyl-4,4',5,5'-tetrachloroazoxybenzene, and 3,3',4,4'-tetrachloroazoxybenzene.

2. The process of claim 1 wherein the compound administered is 2,2',3,3',4,4'-hexachloroazoxybenzene.

3. The process of claim 1 wherein the compound administered is 3,3',4,4'-tetrachloroazoxybenzene.

4. The process of claim 1 wherein the compound administered is 3,3',4,4'-tetrachloroazobenzene.

References Cited

Chemical Abstracts (I) 25: 923[9] to 924[2] (1931).
Chemical Abstracts (II) 25: 3633[7] (1931).
Chemical Abstracts (III) 35: 6942[4] (1940).
Chemical Abstracts (IV) 51: 16882g (1957).

JEROME D. GOLDBERG, Primary Examiner